United States Patent
Chun

(10) Patent No.: US 11,212,721 B2
(45) Date of Patent: Dec. 28, 2021

(54) METHOD FOR PERFORMING REGISTRATION WITH NETWORK IN WIRELESS COMMUNICATION SYSTEM AND DEVICE THEREFOR

(71) Applicant: LG ELECTRONICS INC., Seoul (KR)

(72) Inventor: Sungduck Chun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/755,549

(22) PCT Filed: Oct. 12, 2018

(86) PCT No.: PCT/KR2018/012044
§ 371 (c)(1),
(2) Date: Apr. 10, 2020

(87) PCT Pub. No.: WO2019/074325
PCT Pub. Date: Apr. 18, 2019

(65) Prior Publication Data
US 2021/0204180 A1    Jul. 1, 2021

Related U.S. Application Data

(60) Provisional application No. 62/571,273, filed on Oct. 12, 2017, provisional application No. 62/607,924, filed on Dec. 20, 2017.

(51) Int. Cl.
*H04W 4/00* (2018.01)
*H04W 36/00* (2009.01)
(Continued)

(52) U.S. Cl.
CPC ....... *H04W 36/0079* (2018.08); *H04W 36/08* (2013.01); *H04W 60/04* (2013.01); *H04W 76/30* (2018.02)

(58) Field of Classification Search
CPC ......... H04W 36/0069; H04W 36/0079; H04W 36/08; H04W 36/10; H04W 36/12;
(Continued)

(56) References Cited

U.S. PATENT DOCUMENTS

| 2004/0162077 A1* | 8/2004 | Kauranen | H04W 48/18 455/445 |
| 2005/0090255 A1* | 4/2005 | Kuchibhotla | H04W 48/12 455/435.2 |

(Continued)

FOREIGN PATENT DOCUMENTS

| EP | 3429309 | 1/2019 |
| WO | 2017166165 | 10/2017 |

OTHER PUBLICATIONS

Mokia, "Interworking with EPS," 3GPP TSG-CT WG1 #105, C1-173500, Aug. 2017, 12 pages.
(Continued)

*Primary Examiner* — Matthew W Genack
(74) *Attorney, Agent, or Firm* — Lee Hong Degerman Kang & Waimey

(57) ABSTRACT

Disclosed are a method for performing registration with a network in a wireless communication system and a device therefor. Specifically, a method for performing registration with a core network by a user equipment (UE) in a wireless communication system may comprise the steps of: transmitting a registration request message to a first core network in a first cell; receiving a registration rejection message from the first core network in the first cell; discovering a second core network which is of a different type from the first core network and is supported in the first cell; when the second core network supported in the first cell is discovered, determining whether the UE supports the second core network; and when the UE supports the second core network, per-
(Continued)

forming a registration procedure with the second network in the first cell.

14 Claims, 9 Drawing Sheets

(51) Int. Cl.
    *H04W 76/30*     (2018.01)
    *H04W 36/08*     (2009.01)
    *H04W 60/04*     (2009.01)

(58) Field of Classification Search
    CPC ..... H04W 60/00; H04W 60/04; H04W 76/18; H04W 76/30
    See application file for complete search history.

(56) References Cited

U.S. PATENT DOCUMENTS

| | | | | |
|---|---|---|---|---|
| 2005/0107095 A1* | 5/2005 | Samuel | ................ | H04W 24/00 455/456.5 |
| 2012/0120802 A1* | 5/2012 | Mach | .................... | H04W 28/02 370/235 |
| 2015/0109918 A1* | 4/2015 | Sharma | ............ | H04W 36/0055 370/230 |
| 2017/0013518 A1* | 1/2017 | Kilgour | ............ | H04W 36/0061 |
| 2017/0019844 A1 | 1/2017 | Liang et al. | | |
| 2017/0064593 A1* | 3/2017 | Khay-Ibbat | ..... | H04W 36/00837 |

OTHER PUBLICATIONS

China Mobile, "Handing of Single Registration without Nx support," SA WG2 Meeting #121, S2-173063, May 2017, 3 pages.
European Patent Office Application Serial No. 18867133.3, Search Report dated Sep. 23, 2020, 11 pages.
Huawei, "Handling on E-UTRA cell which only connects to 5G core," 3GPP TSG-RAN WG2 Meeting #99, R2-1708395, Aug. 2017, 5 pages.
Vivo, "General Aspects on LTE connected to 5GCN," 3GPP TSG-RAN WG2 #99, R2-1708435, Aug. 2017, 9 pages.
Vivo, "Mobility issue in LTE connected to NextGen Core," 3GPP TSG-RAN WG2 #99, R2-1708436, Aug. 2017, 5 pages.
Samsung, "Further considerations on the CN selection for E-UTRAN Connected to 5G CN," 3GPP TSG-RAN WG1 #65, R2-1710789, Sep. 2017, 8 pages.
Huawei, "Discussion on mobility scenario for E-UTRA connected to 5GC," 3GPP TSG-RAN WG2 Meeting #99bis, R2-1711112, Oct. 2017, 5 pages.
PCT International Application No. PCT/KR2018/012044, International Search Report dated Jan. 25, 2019, 4 pages.
Indian Patent Office Application Serial No. 202027019430, Office Action dated Jun. 15, 2021, 5 pages.

* cited by examiner

[Fig. 1]
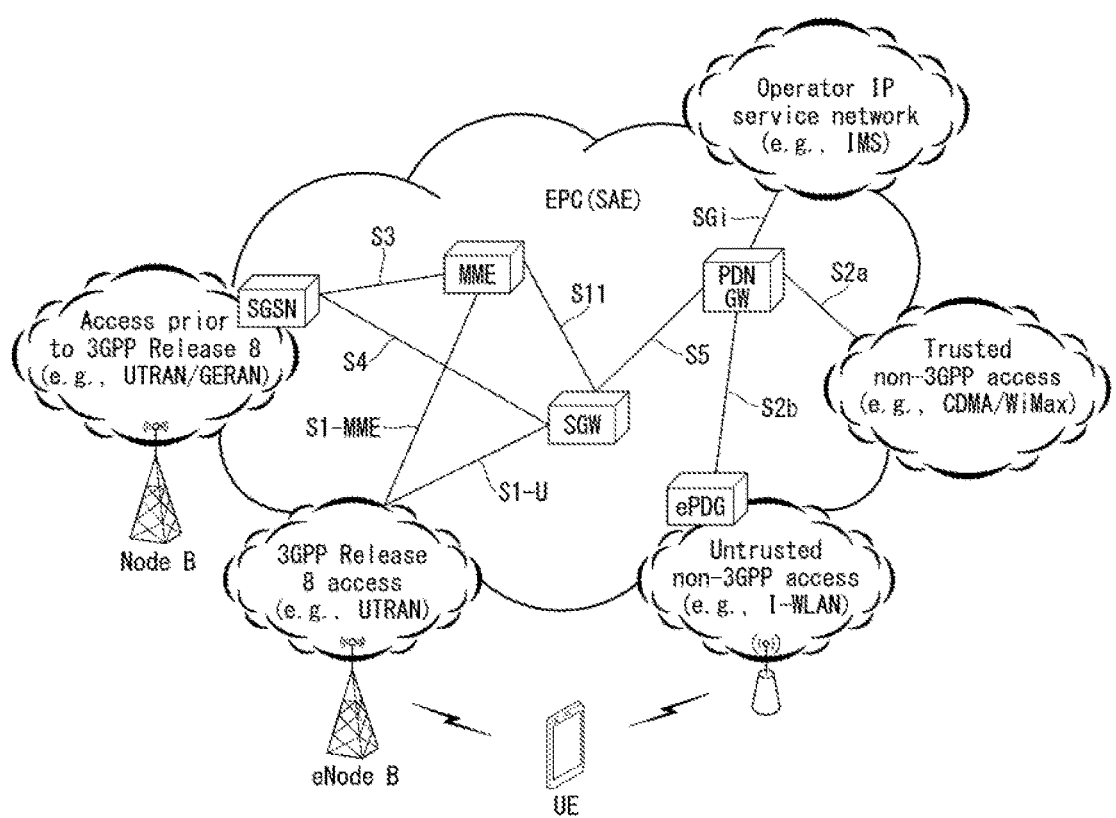

[Fig. 2]
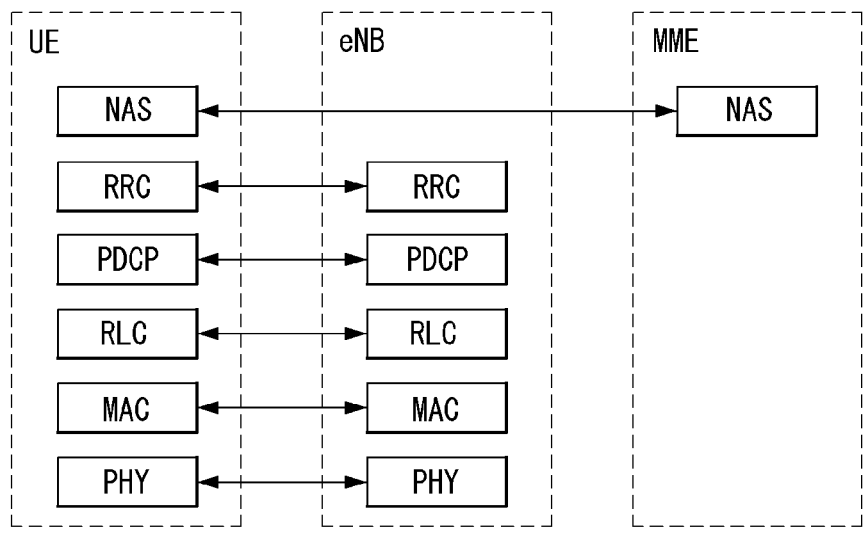
(a) Control plane protocol stack
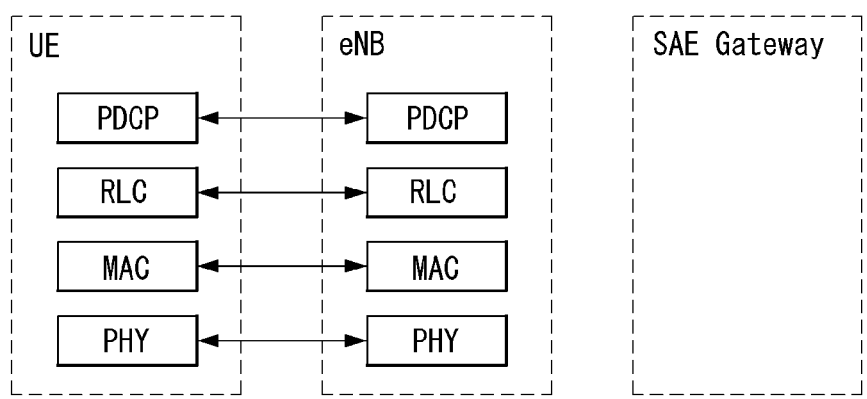
(b) User plane protocol stack 【Fig. 3】
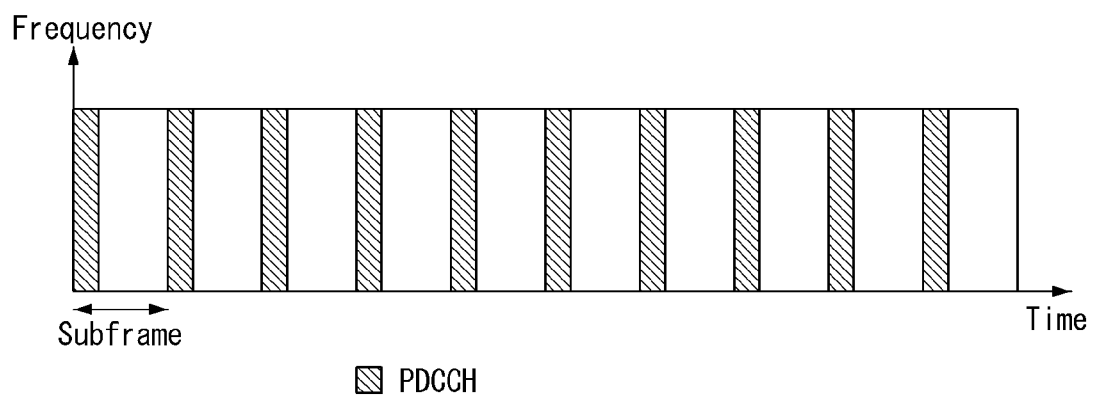
【Fig. 4】
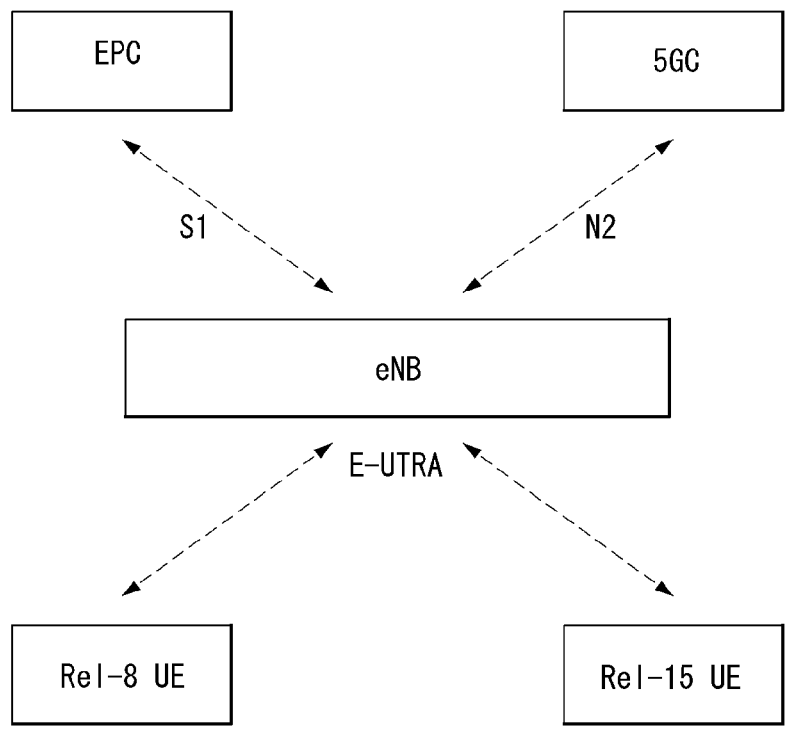

【Fig. 5】
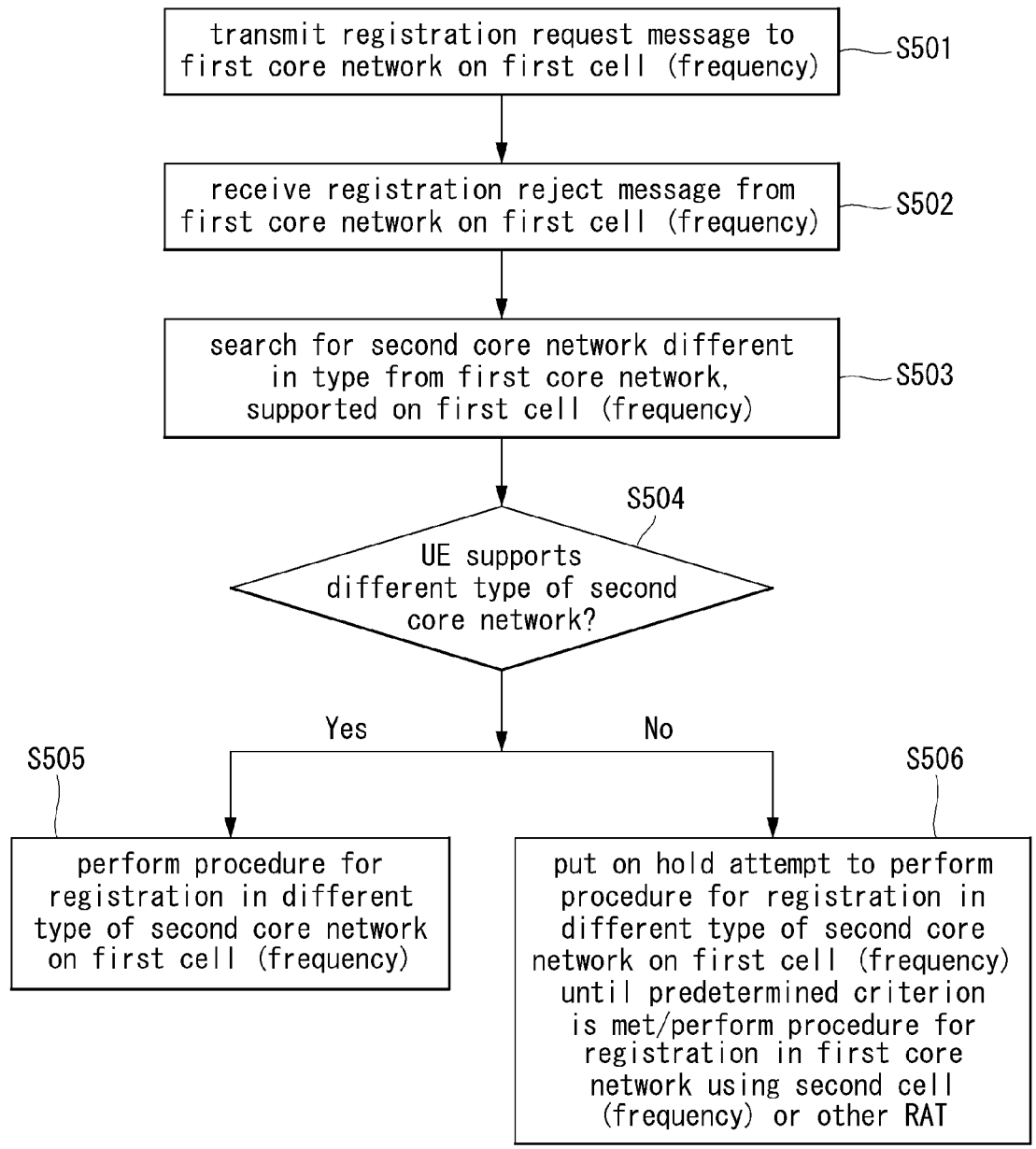

[Fig. 6]
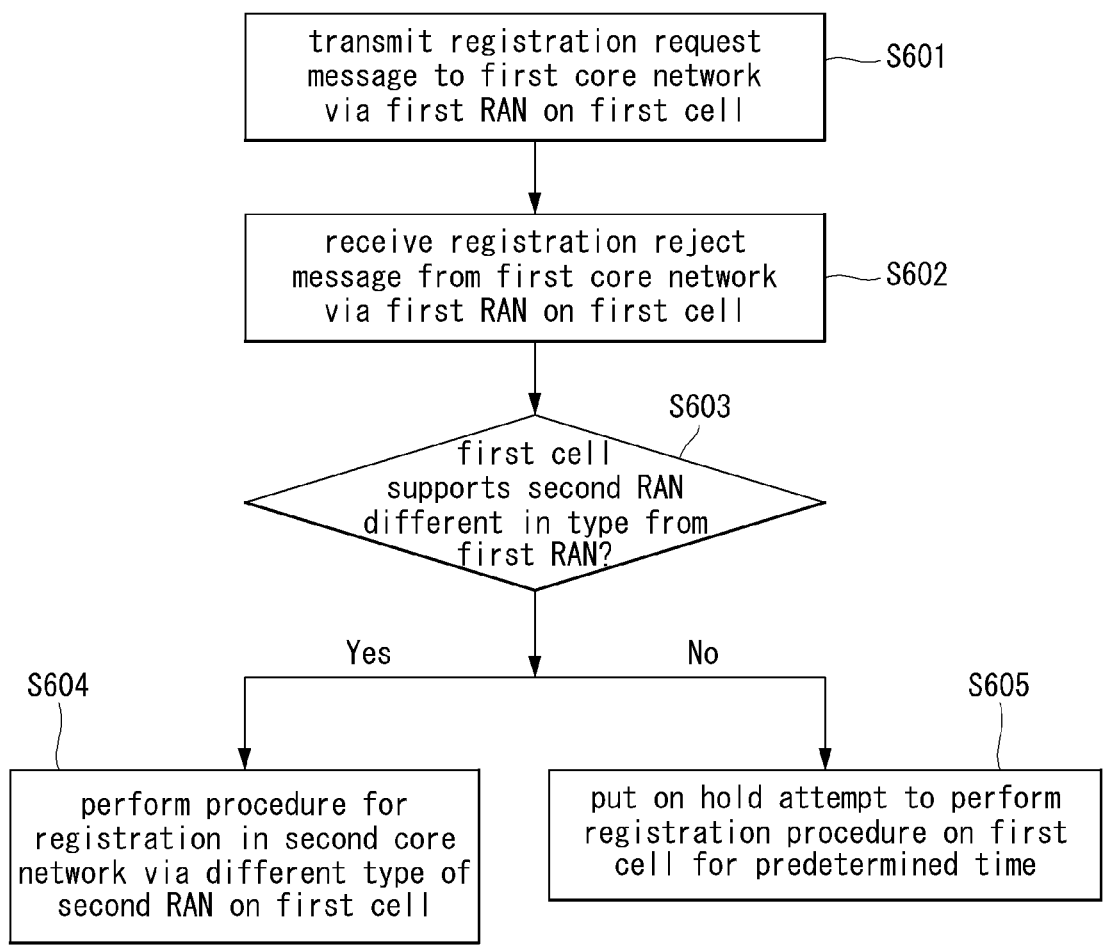

[Fig. 7]

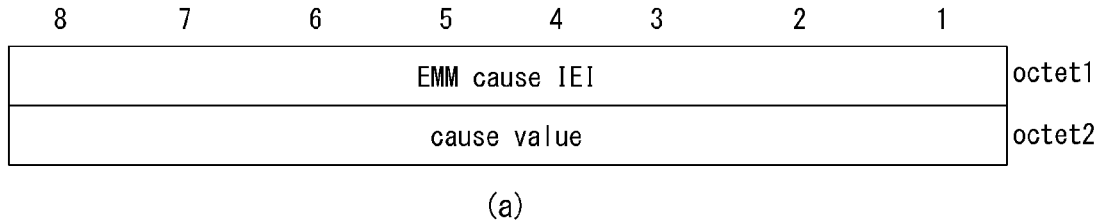

(a)

| Cause value (octet 2) | | | | | | | | |
|---|---|---|---|---|---|---|---|---|
| Bits | | | | | | | | |
| 8 | 7 | 6 | 5 | 4 | 3 | 2 | 1 | |
| 0 | 0 | 0 | 0 | 0 | 0 | 1 | 0 | IMSI in HSS unknown |
| 0 | 0 | 0 | 0 | 0 | 0 | 1 | 1 | illegal UE |
| 0 | 0 | 0 | 0 | 0 | 1 | 0 | 1 | IMEI not accepted |
| 0 | 0 | 0 | 0 | 0 | 1 | 1 | 0 | illegal ME |
| 0 | 0 | 0 | 0 | 0 | 1 | 1 | 1 | EPS service not accepted |
| 0 | 0 | 0 | 0 | 1 | 0 | 0 | 0 | EPS service and non-EPS service not allowed |
| 0 | 0 | 0 | 0 | 1 | 0 | 0 | 1 | UE ID not derived by network |
| 0 | 0 | 0 | 0 | 1 | 0 | 1 | 0 | implicit detach |
| 0 | 0 | 0 | 0 | 1 | 0 | 1 | 1 | PLMN not allowed |
| 0 | 0 | 0 | 0 | 1 | 1 | 0 | 0 | TA not allowed |
| 0 | 0 | 0 | 0 | 1 | 1 | 0 | 1 | roaming in this TA not allowed |
| 0 | 0 | 0 | 0 | 1 | 1 | 1 | 0 | EPS service in this PLMN not allowed |
| 0 | 0 | 0 | 0 | 1 | 1 | 1 | 1 | inadequate cell in TA |
| 0 | 0 | 0 | 1 | 0 | 0 | 0 | 0 | MSC temporarily not reached |
| 0 | 0 | 0 | 1 | 0 | 0 | 0 | 1 | network failure |
| 0 | 0 | 0 | 1 | 0 | 0 | 1 | 0 | CS domain unavailable |
| 0 | 0 | 0 | 1 | 0 | 0 | 1 | 1 | ESM failure |
| 0 | 0 | 0 | 1 | 0 | 1 | 0 | 0 | MAC failure |
| 0 | 0 | 0 | 1 | 0 | 1 | 0 | 1 | sync failure |
| 0 | 0 | 0 | 1 | 0 | 1 | 1 | 0 | congestion |
| 0 | 0 | 0 | 1 | 0 | 1 | 1 | 1 | UE security capability inappropriate |
| 0 | 0 | 0 | 1 | 1 | 0 | 0 | 0 | security mode rejected, unspecified |
| 0 | 0 | 0 | 1 | 1 | 0 | 0 | 1 | no authority for this CSG |
| 0 | 0 | 0 | 1 | 1 | 0 | 1 | 0 | non-EPS authority not accepted |
| 0 | 0 | 1 | 0 | 0 | 0 | 1 | 1 | requested service option not permitted in this PLMN |
| 0 | 0 | x | x | x | x | x | x | current RAT not allowed |
| 0 | 0 | 1 | 0 | 0 | 1 | 1 | 1 | CS service temporarily unavailable |
| 0 | 0 | 1 | 0 | 1 | 0 | 0 | 0 | non-EPS bearer context activated |
| 0 | 0 | 1 | 0 | 1 | 0 | 1 | 0 | severe network failure |
| 0 | 1 | 0 | 1 | 1 | 1 | 1 | 1 | unclear message |
| 0 | 1 | 1 | 0 | 0 | 0 | 0 | 0 | invalid mandatory information |
| 0 | 1 | 1 | 0 | 0 | 0 | 0 | 1 | message type not present or implemented |
| 0 | 1 | 1 | 0 | 0 | 0 | 1 | 0 | message type incompatible with protocol state |
| 0 | 1 | 1 | 0 | 0 | 0 | 1 | 1 | information element not present or implemented |
| 0 | 1 | 1 | 0 | 0 | 1 | 0 | 0 | conditional IE error |
| 0 | 1 | 1 | 0 | 0 | 1 | 0 | 1 | message incompatible in protocol state |
| 0 | 1 | 1 | 0 | 1 | 1 | 1 | 1 | protocol error, unspecified | any other value received by UE is treated as 0110 1111, "protocol error," or "unspecified." Any other value received by network is treated as 0110 1111, "protocol error," or "unspecified."

| 8 | 7 | 6 | 5 | 4 | 3 | 2 | 1 | |
|---|---|---|---|---|---|---|---|---|
| EMM cause IEI | | | | | | | | octet1 |
| cause value | | | | | | | | octet2 |

(a)

```
Cause value (octet 2)

Bits
8  7  6  5  4  3  2  1
0  0  0  0  0  0  1  0    IMSI in HSS unknown
0  0  0  0  0  0  1  1    illegal UE
0  0  0  0  0  1  0  1    IMEI not accepted
0  0  0  0  0  1  1  0    illegal ME
0  0  0  0  0  1  1  1    EPS service not accepted
0  0  0  0  1  0  0  0    EPS service and non-EPS service not allowed
0  0  0  0  1  0  0  1    UE ID not derived by network
0  0  0  0  1  0  1  0    implicit detach
0  0  0  0  1  0  1  1    PLMN not allowed
0  0  0  0  1  1  0  0    TA not allowed
0  0  0  0  1  1  0  1    roaming in this TA not allowed
0  0  0  0  1  1  1  0    EPS service in this PLMN not allowed
0  0  0  0  1  1  1  1    inadequate cell in TA
0  0  0  1  0  0  0  0    MSC temporarily not reached
0  0  0  1  0  0  0  1    network failure
0  0  0  1  0  0  1  0    CS domain unavailable
0  0  0  1  0  0  1  1    ESM failure
0  0  0  1  0  1  0  0    MAC failure
0  0  0  1  0  1  0  1    sync failure
0  0  0  1  0  1  1  0    congestion
0  0  0  1  0  1  1  1    UE security capability inappropriate
0  0  0  1  1  0  0  0    security mode rejected, unspecified
0  0  0  1  1  0  0  1    no authority for this CSG
0  0  0  1  1  0  1  0    non-EPS authority not accepted
0  0  1  0  0  0  1  1    requested service option not permitted in this PLMN 0  0  x  x  x  x  x  x    current RAT not allowed
0  0  x  x  x  x  x  y    Current CN type is not allowed
0  0  x  x  x  x  y  x    Try other CN type (5G CN)
0  0  1  0  0  1  1  1    CS service temporarily unavailable
0  0  1  0  1  0  0  0    non-EPS bearer context activated
0  0  1  0  1  0  1  0    severe network failure
0  1  0  1  1  1  1  1    unclear message
0  1  1  0  0  0  0  0    invalid mandatory information
0  1  1  0  0  0  0  1    message type not present or implemented
0  1  1  0  0  0  1  0    message type incompatible with protocol state 0  1  1  0  0  0  1  1    information element not present or implemented 0  1  1  0  0  1  0  0    conditional IE error
0  1  1  0  0  1  0  1    message incompatible in protocol state
0  1  1  0  1  1  1  1    protocol error, unspecified any other value received by UE is treated as 0110 1111, "protocol error," or "unspecified." Any other value received
by network is treated as 0110 1111, "protocol error," or "unspecified."
```

(b)

[Fig. 9]
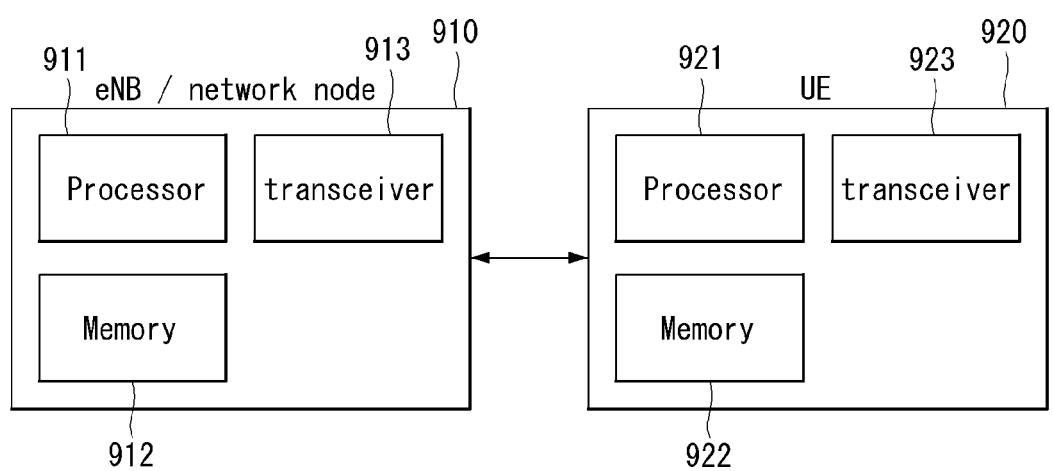

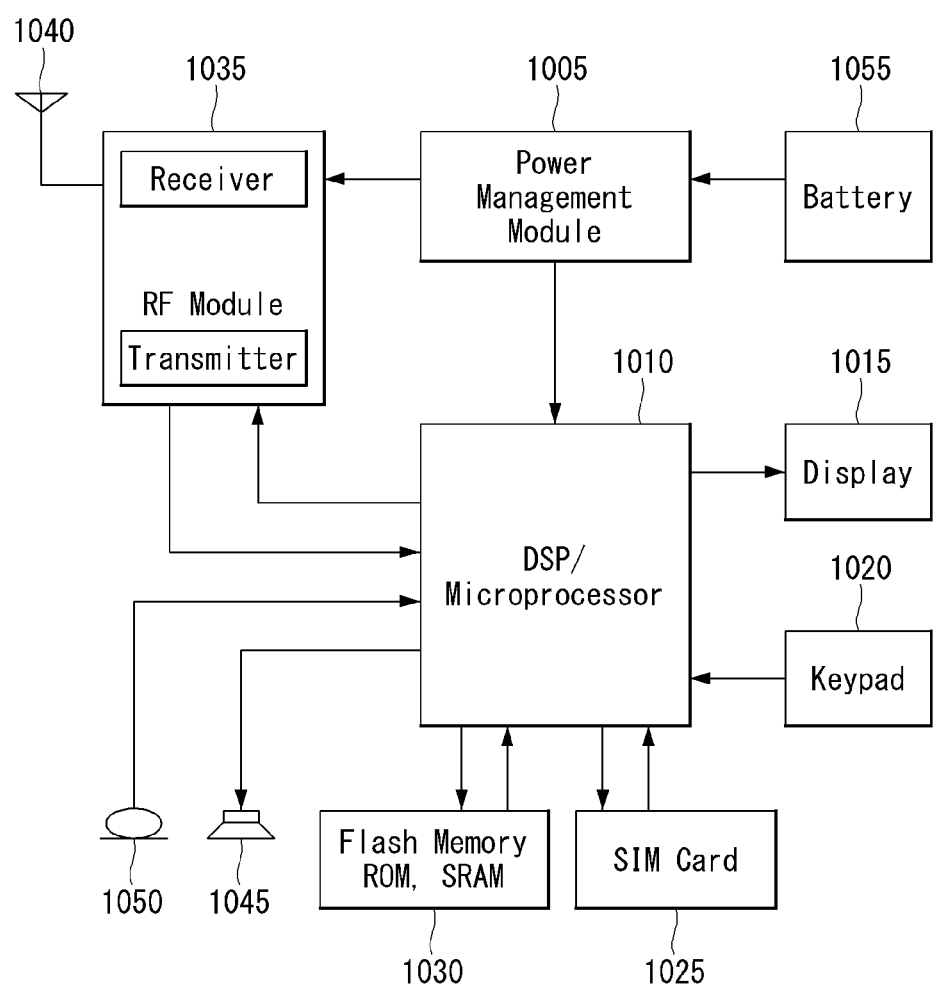
[Fig. 10]

METHOD FOR PERFORMING REGISTRATION WITH NETWORK IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2018/012044, filed on Oct. 12, 2018, which claims the benefit of U.S. Provisional Application No. 62/571,273, filed on Oct. 12, 2017, and 62/607,924, filed on Dec. 20, 2017, the contents of which are all hereby incorporated by reference herein in their entirety.

TECHNICAL FIELD

The disclosure relates to a wireless communication system, and more specifically, a method of registering a UE in a core network in an environment where a single radio access network (RAN) supports a plurality of different types of core networks or in an environment where a plurality of different types of RANs support a single core network and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DETAILED DESCRIPTION OF THE DISCLOSURE

Technical Problem

The disclosure aims to propose a method of registering a UE in a core network in an environment where a single RAN supports a plurality of different types of core networks or in an environment where a plurality of different types of RANs support a single core network.

Objects of the present disclosure are not limited to the foregoing, and other unmentioned objects would be apparent to one of ordinary skill in the art from the following description.

Technical Solution

According to an embodiment of the disclosure, a method of performing registration in a core network by a user equipment (UE) in a wireless communication system may comprise transmitting a registration request message to a first core network on a first cell, receiving a registration reject message from the first core network on the first cell, searching for a second core network different in type from the first core network, supported on the first cell, if the second core network supported on the first cell is discovered, determining whether the UE supports the second core network, and if the UE supports the second core network, performing a procedure for registration in the second network on the first cell.

According to another embodiment of the disclosure, a user equipment (UE) performing registration in a core network in a wireless communication system may comprise a transceiver for transmitting or receiving a wireless signal and a processor controlling the transceiver, the processor configured to transmit a registration request message to a first core network on a first cell, receive a registration reject message from the first core network on the first cell, search for a second core network different in type from the first core network, supported on the first cell, if the second core network supported on the first cell is discovered, determine whether the UE supports the second core network, and if the UE supports the second core network, perform a procedure for registration in the second network on the first cell.

Preferably, unless the UE supports the second core network, the UE may regard the first cell as forbidden.

Preferably, the UE may put on hold an attempt to perform the procedure for registration in the second core network until a predetermined criterion is met.

Preferably, unless the UE supports the second core network, the UE may perform a procedure for registration in the first core network on a second cell different from the first cell.

Preferably, when a single base station may connect to both the first core network and the second core network, the single base station may be regarded as a first type of radio access network when connected with the first core network and as a second type of radio access network when connected with the second core network.

Preferably, the first cell may be supported in the first type of radio access network, and the second cell may be supported in the second type of radio access network.

Preferably, the registration reject message may include a cause value for registration rejection, and if the cause value indicates an attempt at registration in the second core network different in type of the first core network, the UE may re-determine whether a signal strength of the first cell is a predetermined level or more.

Preferably, when the signal strength of the first cell is the predetermined level or more, the UE may perform a procedure for registration in the second core network supported on the first cell.

Preferably, unless the signal strength of the first cell is the predetermined level or more, the UE may select a second cell different from the first cell.

Preferably, when a public land mobile network (PLMN) of the second cell differs from a PLMN of the first cell, and the PLMN of the second cell is not a forbidden PLMN, the UE may perform the procedure for registration in the first core network on the second cell.

Preferably, when the PLMN of the second cell is identical to the PLMN of the first cell, but a tracking area (TA) of the second cell differs from a TA of the first cell and the TA of the second cell is not a forbidden TA, the UE may perform the procedure for registration in the first core network on the second cell.

Preferably, if the second cell supports the second core network when the PLMN and TA of the second cell are identical to the PLMN and TA of the first cell, the UE may perform the procedure for registration in the second core network.

Advantageous Effects

According to an embodiment of the disclosure, the UE may stably receive radio access services.

Further, according to an embodiment of the disclosure, the UE may be effectively registered in a network quickly and with the service break time minimized.

Effects of the present disclosure are not limited to the foregoing, and other unmentioned effects would be apparent to one of ordinary skill in the art from the following description.

BRIEF DESCRIPTION OF DRAWINGS

A more complete appreciation of the present disclosure and many of the attendant aspects thereof will be readily obtained as the same becomes better understood by reference to the following detailed description when considered in connection with the accompanying drawings, wherein:

FIG. 1 is a view schematically illustrating an evolved packet system (EPS) to which the disclosure may apply.

FIG. 2 illustrates a structure of a radio interface protocol between a UE and an E-UTRAN in a wireless communication system to which the disclosure may apply.

FIG. 3 is a view schematically illustrating a structure of a physical channel in a wireless communication system to which the disclosure may apply.

FIG. 4 illustrates an example network architecture to which the disclosure may apply.

FIG. 5 is a view illustrating a method of registering a UE in a network according to an embodiment of the disclosure.

FIG. 6 is a view illustrating a method of registering a UE in a network according to an embodiment of the disclosure.

FIG. 7 illustrates an example of EMM cause information element according to an embodiment of the disclosure.

FIG. 8 illustrates an example of EMM cause information element according to an embodiment of the disclosure.

FIG. 9 is a block diagram illustrating a configuration of a communication device according to an embodiment of the disclosure.

FIG. 10 is a block diagram illustrating a configuration of a communication device according to an embodiment of the disclosure.

MODE FOR CARRYING OUT THE DISCLOSURE

In what follows, preferred embodiments according to the present disclosure will be described in detail with reference to appended drawings. The detailed descriptions provided below together with appended drawings are intended only to explain illustrative embodiments of the present disclosure, which should not be regarded as the sole embodiments of the present disclosure. The detailed descriptions below include specific information to provide complete understanding of the present disclosure. However, those skilled in the art will be able to comprehend that the present disclosure can be embodied without the specific information.

For some cases, to avoid obscuring the technical principles of the present disclosure, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present disclosure, and the specific terms can be used in different ways as long as it does not leave the technical scope of the present disclosure.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present disclosure can be supported by standard documents disclosed in at least one of wireless access systems including the IEEE 802, 3GPP, and 3GPP2 specifications. In other words, among the embodiments of the present disclosure, those steps or parts omitted for the purpose of clearly describing technical principles of the present disclosure can be supported by the documents above. Also, all of the terms disclosed in this document can be explained with reference to the standard documents.

To clarify the descriptions, this document is based on the 3GPP LTE/LTE-A, but the technical features of the present disclosure are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

Public Land Mobile Network (PLMN): a network formed to provide mobile communication services to individuals. The PLMN can be formed separately for each operator.

In what follows, the present disclosure will be described based on the terms defined above.

Overview of system to which the present disclosure may be applied

FIG. 1 illustrates an Evolved Packet System (EPS) to which the present disclosure can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates a structure of a radio interface protocol between a UE and an E-UTRAN in a wireless communication system to which the disclosure may apply.

FIG. 2(a) illustrates a radio protocol structure for a control plane, and FIG. 2(b) illustrates a radio protocol structure for a user plane.

Referring to FIG. 2, radio interface protocol layers between UE and E-UTRAN may be divided into a first layer L1, a second layer L2, and a third layer L3 based on the lower three layers of the open system interconnection (OSI) standard model well known in the art of communication system. The radio interface protocol between UE and E-UTRAN consists of a physical layer, a data link layer, and a network layer, horizontally, and is divided, vertically, into a user plane, which is a protocol stack for transmission of data information, and a control plane, which is a protocol stack for transmission of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers.

A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 3 is a view schematically illustrating a structure of a physical channel in a wireless communication system to which the disclosure may apply.

Referring to FIG. 3, a physical channel transfers signaling and data via a radio resource constituted of one or more subcarriers in the frequency domain and one or more symbols in the time domain.

One subframe is 1.0 ms long and consists of a plurality of symbols. A specific symbol(s) of the subframe (e.g., the first symbol of the subframe) may be used for the PDCCH. The PDCCH carries information for a resource dynamically allocated (e.g., resource block or modulation and coding scheme (MCS)).

Method of Registering UE in Network

To provide further advanced mobile communication services over the above-described LTE and EPC-based EPS systems, standardization is in progress, and such brand-new systems are called a 5G system.

A 5G system includes a 5G core network (5GC or 5G CN or 5CN, 5G core network) including, e.g., an access and mobility management function (AMF)/user plane function (UPF) and new generation (NG)-RANs including gNBs or eNBs (and/or ng-eNBs). For the components of the 5GC, such as the AMF/UPF, see 3GPP TS 23.501,23.502.

The NG-RANs may include gNBs and eNBs. Here, gNB is a radio node operated based on new RAT (NR) which is a newly established radio access standard for 5G, and eNB is the one used in the legacy EPS/E-UTRAN and is operated based on the E-UTRA. In other words, gNB means an NG-RAN, a node connected to the 5G CN. eNB is an E-UTRAN, a node connected to the EPC. The eNB uses e-UTRA and is connected with the EPC. The ng-eNB uses e-UTRA and is connected with the 5G CN. Hereinafter, unless explicitly differentiated between eNB and ng-eNB, eNB and ng-eNB may be collectively referred to as eNB.

5G systems allow legacy eNBs as well as gNBs to access the 5GC. This is for supporting the service providers to be able to update only core network to 5CN while reusing the radio nodes that used to be used in legacy EPS. That is, since the service providers have made a massive investment in installation of legacy radio nodes, and many users still use fourth generation (4G)-based UEs, the service providers desire to continue to use the legacy radio nodes. The service providers also desire to use new functions the 5GC supports, e.g., network slicing. That is, to meet various service requirements at lower costs, core networks with new functions have been adopted.

FIG. 4 illustrates an example network architecture to which the disclosure may apply.

Referring to FIG. 4, an eNB may be connected to a legacy EPC or a new 5GC. That is, although the E-UTRA scheme is used between the UE and eNB as conventional, the eNB is connected with the EPC via an S1 interface and simultaneously with the 5GC via an N2 interface (i.e., ng-eNB).

However, the UE needs to be aware whether its selected eNB or cell supports EPC or 5GC alone or bot the EPC and 5GC. Otherwise, if a legacy, old-fashioned UE accesses the eNB that supports only 5GC, it may receive no service. Likewise, if a new UE supporting 5GC alone accesses the eNB that supports only EPC, no service is received likewise.

Thus, the eNB needs to information for what CN it supports to the UE, and only when receiving the information for the CN it supports from the eNB, the UE selects the eNB and cell and should perform a registration procedure.

Meanwhile, the UE needs to be ensured for mobility and should be serviced even off the area which is managed by the service carrier to which the UE has subscribed. To that end, each mobile communication carrier enters into a roaming contact with other carriers. For example, a carrier who provides LTE service in area A has a contract for roaming with other carrier servicing other area, and off area A, a subscriber of the carrier for area A is served by the other carrier. However, in this process, the carrier limits roaming depending on its context.

Example 1

A first carrier K provides an LTE service in the whole area A and a 5G service in a portion of area A. The first carrier K desires to provide the 5G service to its subscribers via other, second carrier K only in the non-5G served portion of area A. Further, the first carrier K does not permit its subscribers to be served LTE service via the second carrier K in the entire area A.

Example 2

A first carrier K provides an LTE service and a 5G service in the whole area A. The first carrier K provides the subscribers of the LTE service with the LTE service but not 5G service. The first carrier K provides both the LTE and 5G services to the subscribers of the 5G service.

As in example 1 above, the carrier may limit permission of use by each user.

However, in applying the above-described scenario cases, the operation of the UE according to the prior art may increase the time during which the UE fails to receive service and put the UE in the context where the service is limited.

In particular, if the eNB has a chance of being connected to both the 5G CN and EPC, the conventional cell selection process causes some UE to fail to receive service even in the context where the UE supports both the 5G and LTE services.

For example, operations according to 3GPP TS 36.304 are as follows.

For the highest ranked cell (including the serving cell) according to cell reselection criteria, for the best cell according to the absolute priority reselection criteria, the UE checks whether access is limited.

If the corresponding cell or other cells need to be excluded from the candidate list, the UE does not consider them as candidates upon cell reselection. If the highest ranked cell is changed, such limitation needs to be removed.

If the highest ranked cell or the best cell according to the absolute priority reselection rule is part of the list of forbidden tracking areas (TAs) for roaming" or belongs to a PLMN not indicated as equivalent to the registered PLMN, and so, it is an inappropriate intra-frequency cell or inter-frequency cell, the UE does not consider this cell or other cells on the same frequency as candidates for reselection for up to 300 seconds. If the UE enters the "any cell selection" state, any limitations are removed. If the timer is redirected to the driving frequency with the UE controlled by E-UTRAN, any limitations on the frequency are eliminated.

If the highest ranked cell or the best cell according to the absolute priority reselection rule is part of the list of forbidden tracking areas (TAs) for roaming" or belongs to a PLMN not indicated as equivalent to the registered PLMN, and so, it is an inappropriate inter-RAT cell, the UE does not consider this cell as candidate for reselection for up to 300 seconds. If the UE enters the "any cell selection" state, any limitations are removed. If the timer is redirected to the driving frequency with the UE controlled by E-UTRAN, any limitations on the frequency are eliminated.

If the highest ranked cell or the best cell according to the absolute priority reselection rule does not belong to the closed subscriber group (CSG) member cells, and is thus an inappropriate CSG cell, the UE does not consider this cell as a candidate for cell reselection but keeps on considering other cells on the same frequency for cell reselection.

For example, the following scenario case is assumed.

Step 0: (Presumption) UE A functionally supports both EPS and 5G systems. However, according to a service contract with the carrier, UE A may use the 5G system only in a specific area (e.g., subway stations) and LTE alone in the rest. However, the user of UE A desires to first use 5G system.

Step 1: The user powers on UE A off the specific area mentioned in step 0. The UE attempts to register first in the 5G system according to the user's preference.

Step 2: The 5G system analyzes the user's subscription information, identifies that use of the 5G system in the area where the user attempts to register is forbidden, and transmits a registration rejection message to UE A.

Step 3: According to the above-described 3GPP TS 36.304 operations, the UE determines that the cell and frequency of the area have been forbidden.

Thus, after step 3, UE A receives no service for at least 300 seconds.

The "list of forbidden tracking areas (TAs) for roaming" is merely an example, and the following disclosure may be applied to other lists related to management of tracking areas.

To address the above-described issues, according to the disclosure, there is proposed a method in which the UE performs a process of registration in the network quickly and with the service break time minimized, if a certain cell (or frequency) or some eNB simultaneously supports several types of core networks (e.g., 5G CN and EPC).

FIG. 5 is a view illustrating a method of registering a UE in a network according to an embodiment of the disclosure.

Referring to FIG. 5, the UE discovers cells with a predetermined quality level or more in the area where it is located and sorts the cells in descending order of signal strength. The UE additionally filters the cells meeting a criterion indicated in a higher layer (e.g., the NAS layer). The UE selects the best signal cell among the cells and performs a procedure for registration in the network.

That is, the UE transmits a registration request message (or attach request message) to a first core network on a first cell (frequency) (S501).

During this course, if the first core network rejects the UE's registration in the registration procedure, the UE receives a registration reject message (or attach reject message) from the first core network over the first cell (or frequency) (S502).

The UE does a search on whether other types of core networks than the first core network registration requested are supported on the first cell (or frequency) where the registration reject message has been received (S503).

If a type of core network (this is referred to as a second core network) is discovered (supported) on the first cell (or frequency), the UE determines (checks) whether it further supports the second core network (S504).

If it is determined in step S504 that the UE supports the second core network which is of a different type than the first core network, the UE does not transition to other frequency or cell and selects a different type of second core network on the first cell (or frequency) and performs a registration procedure (S505).

However, in this process, if the UE has attempted the registration procedure before step S501 on the different type of second core network and, in the process, registration failed, the UE stops attempting a procedure for registration in the second core network until a predetermined criterion is met.

In contrast, if it is determined in step S504 that the UE does not support the second core network that is of a different type than the first core network, the UE regards the cell and/or frequency as forbidden and, until a predetermined criterion is met, puts on hold an attempt to perform a procedure for registration in the different type of second core network or performs a procedure for registration in the first core network using other frequency or cell or other radio access technique.

The process of FIG. 5 is merely an example, and the process of FIG. 5 may be performed based on the radio access network (RAN) instead of the core network. This is why since NG-RAN denotes a radio access network connected to the 5G CN, and E-UTRAN is a radio access network connected to the EPC, a correlation exists between the type of core network and the type of radio access network.

That is, a single eNB may connect to both the first core network and the second core network which is different in type from the first core network. At this time, if the eNB is connected to the 5G CN, as an example, the base station may be regarded as an NG-RAN and, if the eNB is connected with the EPC, the base station may be regarded as an E-UTRAN. Thus, if the UE regards the eNB/cell as an NG-RAN in the same eNB/cell, the UE may regard the eNB/cell as connected with the 5G system or 5G CN. If the UE regards the eNB/cell as an E-UTRAN in the same eNB/cell, the UE may regard the eNB/cell as connected with the 4G system or EPC.

FIG. 6 is a view illustrating a method of registering a UE in a network according to an embodiment of the disclosure.

In FIG. 6, it is assumed that UE B supports several types of RANs (in particular, E-UTRAN and NG-RAN).

Also assumed is that cell D of frequency C (hereinafter, a first cell) uses the E-UTRA for interfacing with the UE and is managed by eNB E. Further, eNB E is assumed to be an E-UTRAN and an NG-RAN. That is, eNB E may operate as an E-UTRAN and simultaneously as an NG-RAN.

Referring to FIG. 6, depending on its internal settings, UE B first selects a first RAN (e.g., eNB E operates as an NG-RAN) and transmits a registration request message (or attach request message) to the first core network via the first RAN on a first cell (S601). eNB E transmits the UE's registration request to the 5G CN.

In the instant embodiment, it is assumed that the first core network (e.g., if the first RAN is an NG-RAN, the first core network is a 5G CN) analyzes UE B's subscription information and rejects UE B's registration request.

UE B receives a registration reject message (or attach reject message) from the first core network via the first RAN on the first cell (S602).

UE B determines (checks) if the first cell supports a different type of second RAN (e.g., eNB E operates as an E-UTRAN) than the first RAN (S603).

Here, the eNB may broadcast cell information indicating which type of RAN the cell supports to the UE. Further, a 'cell supports an RAN' may mean that the RAN may be accessed via the cell.

If it is determined in step S603 that the first cell supports the second RAN different in type from the first RAN, UE B performs a procedure for registration in the second core network (e.g., if the second RAN is an E-UTRAN, the second core network is an EPC) via the second RAN on the first cell of the same frequency (S604).

In contrast, unless it is determined in step S603 that the first cell supports the second type different in type from the first RAN, UE B regards the frequency as forbidden and puts on hold an attempt for a registration procedure on the first cell of the frequency during a predetermined time.

The above process is merely an example, and the first RAN may be an E-UTRAN (i.e., the first core network is an EPC), and the second RAN may be an NG-RAN (i.e., the second core network is a 5G CN).

The above process is described below in greater detail.

For the highest ranked cell (including the serving cell) according to cell reselection criteria, for the best cell according to the absolute priority reselection criteria, the UE checks whether access is limited.

If the corresponding cell or other cells need to be excluded from the candidate list, the UE does not consider them as candidates upon cell reselection. If the highest ranked cell is changed, such limitation needs to be removed.

If the highest ranked cell or the best cell according to the absolute priority reselection rule is part of the list of forbidden TAs for roaming" or belongs to a PLMN not indicated as equivalent to the registered PLMN, and so, it is an inappropriate intra-frequency cell or inter-frequency cell:

if the cell supports both the E-UTRAN (EPC) and NG-RAN (5GC):

>>if the cell is forbidden for both the E-UTRAN and NG-RAN, the UE does not consider this cell and other cells on the same frequency as candidates for reselection for up to 300 seconds.

>>Otherwise (e.g., if the cell is forbidden for any one of the E-UTRAN or NG-RAN, i.e., not both):

>>>if the UE supports both the E-UTRAN and NG-RAN, the UE may consider this cell and other cells on the same frequency as candidates for reselection for up to 300 seconds. If the UE selects this cell, the UE should attempt a registration procedure without using the forbidden RAN.

>>>Otherwise, the UE does not consider this cell and other cells on the same frequency as candidates for reselection for up to 300 seconds.

Otherwise (i.e., if only one of the E-UTRAN or NG-RAN is supported), the UE does not consider this cell and other cells on the same frequency as candidates for reselection for up to 300 seconds.

If the UE enters the "any cell selection" state, any limitations are removed. If the timer is redirected to the driving frequency with the UE controlled by E-UTRAN, any limitations on the frequency are eliminated.

If the highest ranked cell or the best cell according to the absolute priority reselection rule is part of the list of forbidden tracking areas (TAs) for roaming" or belongs to a PLMN not indicated as equivalent to the registered PLMN, and so, it is an inappropriate inter-RAT cell, the UE does not consider this cell as candidate for reselection for up to 300 seconds. If the UE enters the "any cell selection" state, any limitations are removed. If the timer is redirected to the driving frequency with the UE controlled by E-UTRAN, any limitations on the frequency are eliminated.

If the highest ranked cell or the best cell according to the absolute priority reselection rule does not belong to the closed subscriber group (CSG) member cells, and is thus an inappropriate CSG cell, the UE does not consider this cell as a candidate for cell reselection but keeps on considering other cells on the same frequency for cell reselection.

Embodiment 1

In the process described above in connection with FIG. 5 or 6, the core network notifies the UE of the reason for failure in registration and may allow the UE to perform an additional operation.

Upon receiving a registration request from the UE, the core network may instruct the UE to perform a registration procedure using a different type of core network or different type of RAT (or RAN).

Hereinafter, for ease of description, an ATTACH REJECT message is described as an example. However, the same may be applied likewise to REGISTRATION REJECT messages.

An ATTACH REJECT message is transmitted by the core network to the UE to indicate that the ATTACH REQUEST has been rejected.

Table 2 shows an example format of the ATTACH REJECT message

TABLE 2

| IEI | information element | type/reference | presence | Format | Length |
|---|---|---|---|---|---|
| | protocol discriminator | Protocol discriminator 9.2 | M | V | 1/2 |
| | security header type | Security header type 9.3.1 | M | V | 1/2 |
| | attach reject message identifier | Message type 9.8 | M | V | 1 |
| | EMM cause | EMM cause 9.9.3.9 | M | V | 1 |
| 78 | ESM message container | ESM message container 9.9.3.15 | O | TLV-E | 6-n |
| 5F | T3346 value | GPRS timer 2 9.9.3.16A | O | TLV | 3 |
| 16 | T3402 value | GPRS timer 2 9.9.3.16A | O | TLV | 3 |
| A- | extended EMM cause search alternative RAN/CN | Extended EMM cause 9.9.3.26A | O | TV | 1 |

Referring to Table 2, the information element identifier (IEI) field indicates the identifier of the information element (IE).

The information element field indicates the name of the IE.

The type/reference field indicates the type of the IE (e.g., ENUMERATED, INTEGER, or OCTET STRING) and, if there is a range of values the IE may have, indicates the range.

In the Presence field, 'M' indicates a mandatory IE/IE group always included in the message, 'O' an optional IE/IE group that may be, or may not be, included in the message, and 'C' a conditional IE/IE group that is included in the message only when a specific condition is met.

Format indicates the format of the IE, and length indicates the length of the IE.

The ESM message container IE is included to carry a single EPS session management (ESM) message.

When NAS level mobility management congestion control is activated, the T3346 value IE may be included by the MME.

The T3402 value IE may be included by the network to indicate the value for the T3402 timer.

The extended EMM cause IE may be included by the network to indicate additional information associated with the EPS mobility management (EMM) cause.

The SEARCH alternative RAN/CN IE is used to indicate whether the UE needs to attempt registration using a different type of RAN/CN.

That is, in the example shown in FIGS. 5 and 6, upon receiving an attach reject message along with the IE with the "Search alternative RAN/CN" information set, the UE may attempt registration (access) using the RAN/CN that has not been tried before on the frequency/cell, rather than treating the frequency/cell as forbidden.

For example, if the UE has received the above-described information (i.e., the information with the "Search alternative RAN/CN" set) by attempting a registration procedure by an E-UTRA/E-UTRAN/EPC combination on the frequency/cell, the UE may reattempt a registration procedure with an E-UTRA/NG-RAN/5GC combination.

That is, in the example shown in FIGS. 5 and 6, upon receiving an attach reject message along with the IE with the "Search alternative RAN/CN" information not set, the UE treats the frequency/cell as forbidden and does not select the frequency/cell for registration until a predetermined criterion is met.

As such, when instructed to use a different type of RAN or a different type of CN, the UE, rather than regarding the frequency or cell as forbidden, may camp on the frequency or cell and reattempt registration in (or access to) other core network using the other core network or other RAN.

Further, the network may directly notify the UE that a specific RAT (or RAN) has been forbidden from use. For example, if the UE attempts access using a forbidden RAT (or RAN), the EPC may provide information indicating that the current RAT (or RAN) has been forbidden from use via, e.g., an EMM cause, in the procedure of transmitting an attach reject or tracking area update reject message to the UE. Given the relationship between RAN and CN, the information indicating that the specific RAN has been forbidden is equal to information indicating the specific associated CN has been forbidden from use. Further, since the criteria of EPS and 5GS are associated regarding what CN has been used, this is the same as providing the information indicating what system has been forbidden from use.

In this case, the EMM cause may be extended as follows.

FIG. 7 illustrates an example of EMM cause information element according to an embodiment of the disclosure.

The EMM cause IE is used to indicate why the EMM request from the UE has been rejected by the network. The EMM cause IE is coded as shown in FIG. 7. The EMM cause IE is a type 1 information element.

Referring to FIG. 7(a), the EMM cause IE is coded with a total of 2 octets, wherein one octet indicates the EMM cause IEI, and the other may indicate the cause value.

FIG. 7(b) illustrates example cause values that may be indicated in the EMM cause IE.

As shown in FIG. 7(b), a certain UE has transmitted an attach request message to the EPC and, in response, the MME may transmit an attach reject message to the UE, with the cause value in the EMM cause IE set to '00xxxxxx.'

Upon receiving the attach reject message, the UE interprets it as being able to access the MME but unable to use the NR. Thus, the UE may select the PLMN/RAT to perform an ATTACH again. Although the newly selected PLMN is the same as the PLMN it has attempted before, if there is no prior attach reject received for the RAT or the RAT is not forbidden, the UE may perform an ATTACH using the RAT not forbidden.

Preferably, in the above procedure, upon receiving an ATTACH REJECT or TRACKING AREA UPDATE (TAU) REJECT message, the UE records the state information for reception of the message. For example, the UE may manage a list constituted of combinations of PLMN+TA+RAT. Based on this, the UE may be aware what TA or RAT context the UE is unable to attempt an ATTACH or TAU in and for what PLMN.

Further, in the above-described procedure, the EMM CAUSE may be further specified by information indicating "NR is not allowed" or "E-UTRA is not allowed." In this case, upon receiving the information, the UE determines that in the area or the PLMN, use of NR or E-UTRA has been forbidden and, in the process such as cell selection or PLMN selection, makes no attempt to access via the RAT.

Or, if the EMM cause mentioned in the above procedure is included in the ATTACH REJECT/TAU REJECT message, the UE does not attempt to access nor register in the PLMN. That is, the PLMN is regarded as forbidden. However, the forbidding is released if a change is made to the RAT selected by the UE or the UE changes the PLMN or the UE enters a new TA.

A flow of operations between UE and network is described below.

It is assumed that in the area where the UE is located, some eNB supports E-UTRA alone, other eNB (precisely an ng-eNB) supports NR alone, and both are connected to the EPC. It is also assumed that the eNB and the ng-eNB belong to the same PLMN (PLMN A).

The UE selects PLMN A via a cell/PLMN selection procedure. As a result of cell selection, the UE camps first on the eNB and attempts an ATTACH procedure. That is, the UE transmits an ATTACH REQUEST message to the EPC via the eNB. If the eNB and the ng-eNB support a plurality of RATs in the procedure, information indicating what RAT the message received from the UE has been received via may also be transferred when the message is transferred to the core network.

The EPC receives the ATTACH REQUEST message from the UE. The MME of the EPC analyzes, e.g., the UE's subscription information. Upon determining that the UE is unable to use the E-UTRA, the MME transfers a proper cause value to the UE when transmitting an ATTACH REJECT message.

At this time, the cause value may be varied depending on whether the UE may use other RAT, e.g., NR, of the network.

For example, if the UE is forbidden from using NR and E-UTRA, "EPS service not allowed" may be delivered as the cause value as prior.

In contrast, if the UE is not allowed to use E-UTRA but may be allowed to use NR, as an example, the cause value may be set to a "try NR" or a similarly-purposed EMM cause value.

3. Upon receiving an ATTACH REJECT message from the network, the UE performs an additional operation based on the cause value contained in the message.

If the EMM cause is set to "EPS service not allowed," the UE makes no further attempt to access PLMN A. That is, the UE does not attempt to access the PLMN whether it is of NR or E-UTRA.

If the EMM cause is set to "try NR," the UE may perform one of the following operations.

The operations of the UE are as follows:

The UE may select a new cell.

If the new cell is a different PLMN than the cell previously attempted to attach, and unless the PLMN is a forbidden PLMN, the UE may attempt an ATTACH procedure again.

Or, if the new cell is the same PLMN as, or different TA from, the cell previously attempted to attach, and unless the new TA is a forbidden TA, the UE may attempt an ATTACH/TAU procedure again.

Or, if the new cell is the same PLMN as, and belongs to the same TA as, the cell previously attempted to attach, and this cell differs from the RAT where the ATTACH REJECT message has been received or the cause value of the previously received ATTACH REJECT message is "try NR" and the new cell is an NR, the UE may attempt a new ATTACH procedure.

iii. If none of the cases are met in the above procedure ii, the UE may stop attempting an ATTACH procedure for a predetermined time. After the predetermined time elapses, the UE may again select a cell and attempt an ATTACH procedure.

4. This step may be performed optionally.

When receiving the ATTACH REJECT message or TAU REJECT message and when receiving a value indicating that for the EMM cause, the current RAT cannot be used or other RAT type needs to be selected, the UE may operate as follows.

The UE may store the RAT type information along with the PLMN and/or TA value for which the ATTACH REJCT has been received.

Preferably, the RAT type may be interpreted as a forbidden RAT type.

Or preferably, the UE may determine a range in which the forbidden RAT type information applies. For example, the UE may determine the range in which the forbidden RAT type applies per PLMN or TA. For example, the UE may determine the range in which the forbidden RAT type applies depending on whether other RAT type is supported in the cell where the UE receives the ATTACH REJECT message or TAU REJECT message.

Or, preferably, the network may transfer the range in which the forbidden RAT type applies, along with (or in) the ATTACH REJECT message or TAU REJECT message, to the UE.

ii. In the later procedure of performing cell reselection and PLMN reselection, the UE selects a new cell and may then analyze what RAT the cell supports or what RAT of the cell is. If all the RAT types supported in the cell are determined to be forbidden RAT types, the UE may operate as follows.

The UE may not select the cell.

Or, if the cell is of the best wireless quality, the UE may camp on the cell but may not perform such a procedure as ATTACH/TAU.

Or, in the procedure, the UE may determine whether access to the current cell is permitted or forbidden based on the information for the range in which the forbidden RAT type applies. For example, if the application range of the forbidden RAT type is determined per TA, and the current TA differs from the TA where the ATTACH REJECT message or TAU REJECT message has been received, the UE may determine that in the current cell, the forbidden RAT type information does not apply.

Although the above description has been made based on the EPC's operations, the disclosure is not limited thereto, and messages in a similar manner may apply to operations as 5G CN.

Further, the above-described cause value names and values are merely an example and be replaced with other similarly-purposed values or names.

Further, additionally, in the above procedure, if the core network receives a REGISTRATION REQUEST OR ATTACH REQUEST or TRACKING AREA UPDATE REQUEST message from a certain UE, information about what RAT the UE has used for access is required. To that end, an INITIAL UE MESSAGE, as an example, may be used which is described below in detail.

Further, similar to what has been described above, in the above-described procedure of FIG. 5 or 6, the core network may indicate to the UE that for the EMM cause, the current CN type is forbidden from use or other core network type is to be used.

In this case, the EMM cause may be extended as follows.

FIG. 8 illustrates an example of EMM cause information element according to an embodiment of the disclosure.

The EMM cause IE is used to indicate why the EMM request from the UE has been rejected by the network. The EMM cause IE is coded as shown in FIG. 8. The EMM cause IE is a type 1 information element.

Referring to FIG. 8(a), the EMM cause IE is coded with a total of 2 octets, wherein one octet indicates the EMM cause IEI, and the other may indicate the cause value.

FIG. 8(b) illustrates example cause values that may be indicated in the EMM cause IE.

As shown in FIG. 8(b), a certain UE has transmitted an attach request message to the EPC and, in response, the MME may transmit an attach reject message to the UE, with the cause value in the EMM cause IE set to '00xxxxxy' or '00xxxxyx.'

If the cause value in the EMM cause IE is set to '00xxxxxy,' the UE interprets that registration in the current CN type is not allowed. Or, if the cause value in the EMM cause IE is set to '00xxxxyx,' the UE interprets that registration in other CN type (5G CN) needs to be attempted.

A flow of operations between UE and network is described below.

It is assumed that a certain eNB is in the area where the UE is located, and the eNB connects to both the 5G CN and EPC. At this time, it is assumed that the 5G CN and EPC belong to the same PLMN (PLMN A).

The UE selects PLMN A via a cell/PLMN selection procedure. The UE attempts an ATTACH procedure first to the EPC. That is, the UE transmits an ATTACH REQUEST message to the EPC via the eNB.

The EPC receives the ATTACH REQUEST message from the UE. The MME of the EPC analyzes, e.g., the UE's subscription information. Upon determining that the UE is unable to use the EPS (or EPC), the MME transfers a proper cause value to the UE when transmitting an ATTACH REJECT message.

At this time, the cause value may be varied depending on whether the UE may use a different network, i.e., a 5G CN, than the network.

For example, if the UE is forbidden from using both the EPS and 5G CN, "EPS service not allowed" may be delivered as the cause value as prior.

In contrast, for example, if the UE is not allowed to use EPS but may be allowed to use 5G CN, the cause value may be set to a "try 5G CN."

Or, upon receiving an "EPS service not allowed" during the course of performing an Attach to the EPC/EPS, the UE may determine that only access to the EPS/EPC has been forbidden. In this case, the UE may determine whether to attempt on 5G CN/5GS depending on whether it supports 5G CN/5GS. That is, in this case, the 'try 5G CN' information may be deemed to be indirectly derived. Also in this case, it may be similarly applied in the following description.

[Claim 3]

Upon receiving an ATTACH REJECT message from the network, the UE performs an additional operation based on the cause value contained in the message.

If the EMM cause is set to "EPS service not allowed," the UE makes no further attempt to access PLMN A.

If the EMM cause is set to "try 5G CN," the UE may perform one of the following operations.

Where the current cell supports both 5G CN and EPC:

If the current cell is still of a predetermined quality level or more (i.e., it may be determined again whether the signal strength of the current cell is a predetermined level or more), the UE may attempt a registration procedure by again transmitting an ATTACH REQUEST message to the 5G CN.

Otherwise, the UE may select a new cell.

At this time, if the new cell is a different PLMN than the cell previously attempted to attach, and unless the PLMN is a forbidden PLMN, the UE may attempt an ATTACH procedure again on the new cell.

Or, if the new cell is the same PLMN as, or different TA from, the cell previously attempted to attach, and unless the new TA is a forbidden TA, the UE may attempt an ATTACH/TRACKING AREA UPDATE procedure again on the new cell.

Or, if the new cell is the same PLMN as, and belongs to the same TA as, the cell previously attempted to attach, and if the cell supports access to the 5G CN, the UE may attempt a new ATTACH procedure to the 5G CN on the cell.

If none of the cases are met in the above procedure ii, the UE may stop attempting an ATTACH procedure for a predetermined time. After the predetermined time elapses, the UE may again attempt an ATTACH procedure.

4. This step may be performed optionally.

When receiving the ATTACH REJECT message or TAU REJECT message and when receiving a value indicating that for the EMM cause, the current CN type cannot be used or other CN type needs to be selected, the UE may operate as follows.

The UE may store the CN type information along with the PLMN and/or TA value for which the ATTACH REJCT has been received.

Preferably, the CN type may be interpreted as a forbidden CN type.

Or preferably, the UE may determine a range in which the forbidden CN type information applies. For example, the UE may determine the range in which the forbidden CN type applies per PLMN or TA or RAT. For example, the UE may determine the range in which the forbidden CN type applies depending on whether other CN type is supported in the cell where the UE receives the ATTACH REJECT message or TAU REJECT message.

Or, preferably, the network may transfer the range in which the forbidden CN type applies, along with (or in) the ATTACH REJECT message or TAU REJECT message, to the UE.

ii. In the later procedure of performing cell reselection and PLMN reselection, the UE selects a new cell and may then analyze the CN type information supported by the cell. If all the CN types supported by the cell are determined to be forbidden CN types, the UE may operate as follows.

The UE may not select the cell.

Or, if the cell is of the best wireless quality, the UE may camp on the cell but may not perform such a procedure as ATTACH/TAU.

Or, in the procedure, the UE may determine whether access to the current cell is permitted or forbidden based on the information for the range in which the forbidden CN type applies. For example, if the application range of the forbidden CN type is determined per TA, and the current TA differs from the TA where the ATTACH REJECT message or TAU REJECT message has been received, the UE may determine that in the current cell, the forbidden CN type information does not apply.

Although the above description has been made based on the EPC's operations, the disclosure is not limited thereto, and messages in a similar manner may apply to operations as 5G CN.

Further, the above-described cause value names and values are merely an example and be replaced with other similarly-purposed values or names.

Further, additionally, in the above procedure, if the core network receives a REGISTRATION REQUEST OR ATTACH REQUEST or TRACKING AREA UPDATE REQUEST message from a certain UE, information about what RAT the UE has used for access is required. To that end, an INITIAL UE MESSAGE, as an example, may be used.

The INITIAL UE MESSAGE is transmitted by the eNB to transfer the initial third layer message to the MME via the S1 interface. That is, it may be used to transfer relevant information to the MME when a new UE attaches to the eNB. This message may be extended as follows.

Table 3 shows an example format of the INITIAL UE MESSAGE.

TABLE 3

| IE/Group name | Presence | Range | IE type and reference | Description of meaning | Criticality | Assigned Criticality |
|---|---|---|---|---|---|---|
| Message Type | M | | 9.2.1.1 | | YES | ignore |
| eNB UE S1AP ID | M | | 9.2.3.4 | | YES | reject |
| NAS-PDU | M | | 9.2.3.5 | | YES | reject |
| TAI | M | | 9.2.3.16 | Indicating the Tracking Area from which the UE has sent the NAS message. | YES | reject |
| E-UTRAN CGI | M | | 9.2.1.38 | Indicating the E-UTRAN CGI from which the UE has sent the NAS message. | YES | ignore |
| RRC Establishment Cause | M | | 9.2.1.3a | | YES | ignore |
| S-TMSI | O | | 9.2.3.6 | | YES | reject |
| CSG Id | O | | 9.2.1.62 | | YES | reject |
| GUMMEI | O | | 9.2.3.9 | | YES | reject |
| Cell Access Mode | O | | 9.2.1.74 | | YES | reject |
| GW Transport Layer Address | O | | Transport Layer Address 9.2.2.1 | Indicating GW Transport Layer Address if the GW is collocated with eNB. | YES | ignore |
| Relay Node Indicator | O | | 9.2.1.79 | Indicating a relay node. | YES | reject |
| GUMMEI Type | O | | ENUMERATED (native, mapped, . . .) | | YES | ignore |
| Tunnel Information for BBF | O | | Tunnel Information 9.2.2.3 | Indicating HeNB's Local IP Address assigned by the broadband access provider, UDP port Number. | YES | ignore |
| SIPTO L-GW Transport Layer Address | O | | Transport Layer Address 9.2.2.1 | Indicating SIPTO L-GW Transport Layer Address if the SIPTO L-GW is collocated with eNB. | YES | ignore |
| LHN ID | O | | 9.2.1.92 | | YES | ignore |
| MME Group ID | O | | 9.2.3.44 | | YES | ignore |
| UE Usage Type | O | | INTEGER (0 . . . 255) | | YES | ignore |
| CE-mode-B Support Indicator | O | | 9.2.1.118 | | YES | ignore |
| DCN ID | O | | INTEGER (0 . . . 65535) | | YES | ignore |
| Coverage Level | O | | ENUMERATED (extendedcoverage, . . .) | | YES | ignore |
| Access type (RAT type) | | | RAT type | NR, E-UTRA | | |

Referring to Table 3, the IE/Group name denotes the name of the IE or information element group (IE group).

In the Presence field, 'M' indicates a mandatory IE/IE group always included in the message, 'O' an optional IE/IE group that may be, or may not be, included in the message, and 'C' a conditional IE/IE group that is included in the message only when a specific condition is met.

The Range field denotes the number of repetitions of repetitive IEs/IE groups.

The IE type/reference field indicates the type of the IE (e.g., ENUMERATED, INTEGER, or OCTET STRING) and, if there is a range of values the IE may have, indicates the range.

The Criticality field denotes the criticality information applied to the IE/IE group. The criticality information means information indicating how the receive end needs to operate when the receive end does not appreciate the whole or part of the IE/IE group. '-' denotes that the criticality information does not apply, and 'YES' denotes that the criticality information applies. 'GLOBAL' denotes that the IE and the repetition of the IE have one common piece of criticality information. 'EACH' denotes that each IE repetition has unique criticality information.

The Assigned Criticality field denotes actual criticality information.

As shown in Table 3, the INITIAL UE MESSAGE may include a Message Type), an eNB UE S1AP ID, a NAS-Protocol Data Unit (PDU), a TAI (Tracking Area Identity), an E-UTRAN CGI (E-UTRAN Cell Global Identifier), an RRC Establishment Cause, an S-TMSI (SAE temporary mobile subscriber identity), a CSG ID, a GUMMEI (Globally Unique MME Identifier), a Cell Access Mode, a GW (Gateway) Transport Layer Address, a Relay Node Indicator, a GUMMEI (GUMMEI Type), tunnel information for BBF (Broadband Forum), an SIPTO (Selected IP Traffic Offload) L-GW (Local-Gateway) address (SIPTO L-GW Transport Layer Address), an LHN ID (Local Home Network ID), an MME Group ID, a UE Usage Type, a CE-mode-B Support Indicator, a DCN (Dedicated Core Network) ID (DCN ID), and a Coverage Level, an Access type (or RAT type) IE.

That is, as shown in Table 3, the eNB may inform the MME of the RAT type (e.g., E-UTRA, NR) where the UE has attached via the access type (or RAT type) IE in the INITIAL UE MESSAGE.

A message or information element of a similar purpose may be adopted in the N2 interface (i.e., the interface between AMF and gNB) in the 5GS.

Thus, according to the disclosure, there is proposed a method of effectively indicating what type a UE needs to access before the UE succeeds in an ATTACH procedure, i.e., when the network needs to an ATTACH REJECT message to a UE that has not finished a registration procedure. There is proposed a method to allow the UE to succeed in an ATTACH procedure as soon as possible.

Embodiment 2

The above-described method of informing the UE of the reason for failure in registration using a NAS message as in embodiment 1 may be applied when the CN has somewhat information about other type of CN.

There is a method in which a radio node (eNB or gNB) provides information to the UE even when the CN has no information about other type of CN. That is, in a case where a certain radio node supports a plurality of RAN or CN types, and the UE's registration in a first RAN/CN type fails but registration in other RAN/CN type is allowed, the UE may be informed of this. To that end, an RRC connection release message may be used for such purpose.

The RRC connection release message is used to instruct to release RRC connection between eNB/gNB and UE.

Table 4 shows part of an example RRC connection release message.

TABLE 4

RRCConnectionRelease-v1320-IEs::= SEQUENCE {
resumeIdentity-r13      ResumeIdentity-r13   OPTIONAL, -- Need OR
tryOtherRANCN           Boolean
nonCriticalExtension    SEQUENCE { }         OPTIONAL
}

In Table 4, the tryOtherRANCN field indicates whether the UE needs to attempt a NAS procedure (e.g., ATTACH, TAU, registration) using other type of RAN/CN supported by this cell (i.e., the cell where the RRC connection release message is transmitted) or the frequency where the cell belongs.

That is, after camping on a certain cell, the UE establishes an RRC connection with the eNB/gNB and then transmits a NAS message to the core network. If the core network transmits a reject message for the NAS procedure to the UE, an RRC connection release procedure proceeds. That is, the eNB/gNB transmits an RRC connection release message to the UE.

During this course, if the RAN node (eNB or gNB) supports a plurality of RAN/CN types, and a different CN/RAN from the CN/RAN which has transmitted the reject message to the UE is able to support the UE's access, the eNB/gNB transmits an RRC connection release message with the 'tryOtherRANCN' value sent to the UE.

Thereafter, if the UE receives the RRC connection release message and identifies that the 'tryOtherRANCH' value of the message has been set, the UE may select other type of RAN/CN in the cell or the frequency where the cell belongs and start a registration procedure.

In contrast, if the UE receives the RRC connection release message and identifies that the 'tryOtherRANCN' value of the message has not been set, the UE performs no registration procedure or does not camp on until a predetermined criterion is met in the cell or the frequency where the cell belongs.

Although it has been described that E-UTRA is used between UE and radio access node for ease of description, the same may be applied likewise in other cases, i.e., even when NR is used.

Devices to which the Present Disclosure May Apply

FIG. 9 is a block diagram illustrating a configuration of a communication device according to an embodiment of the disclosure.

Referring to FIG. 9, a wireless communication system includes a network node 910 and multiple UEs 920.

The network node 910 includes a processor 911, a memory 912, and a transceiver 913. The processor 911 implements the functions, processes or steps, and/or methods proposed above in connection with FIGS. 1 to 8. Wired/wireless interface protocol layers may be implemented by the processor 911.

The memory 912 is connected with the processor 911 to store various pieces of information for driving the processor 911. The transceiver 913 is connected with the processor 911 to transmit and/or receive wireless signals. The network node 910 may correspond to, e.g., a base station (eNB, ng-eNB, and/or gNB), MME, HSS, SGW, PGW, SCEF, or SCS/AS. In particular, where the network node 910 is a base station (eNB, ng-eNB, and/or gNB), the transceiver 913 may include a radio frequency (RF) unit for transmitting/receiving wireless signals.

The UE 920 includes a processor 921, a memory 922, and a transceiver (or RF unit) 923. The processor 921 implements the functions, processes or steps, and/or methods proposed above in connection with FIGS. 1 to 8. Wireless interface protocol layers may be implemented by the processor 921. In particular, the processor may include a NAS layer and an AS layer. The memory 922 is connected with the processor 921 to store various pieces of information for driving the processor 921. The transceiver 923 is connected with the processor 921 to transmit and/or receive wireless signals.

The memory 912 and 1322 may be positioned inside or outside the processor 911 and 921 and be connected with the processor 911 and 921 via various known means. The network node 910 (e.g., a base station) and/or the UE 920 may have a single antenna or multiple antennas.

The processor 921 transmits a registration request message (or attach request message) to a first core network via the transceiver 923 on a first cell (frequency).

During this course, if the first core network rejects the UE's registration in the registration procedure, the processor 921 receives, via the transceiver 923, a registration reject message (or attach reject message) from the first core network over the first cell (or frequency).

The processor 921 does a search on whether other types of core networks than the first core network registration requested are supported on the first cell (or frequency) where the registration reject message has been received.

If a type of core network (this is referred to as a second core network) is discovered (supported) on the first cell (or frequency), the processor 921 determines (checks) whether the UE further supports the second core network.

If the UE supports the second core network which is of a different type than the first core network, the processor 921 does not transition to other frequency or cell via the transceiver 923 and selects a different type of second core network on the first cell (or frequency) and performs a registration procedure.

However, in this process, if the UE has attempted the registration procedure before on the different type of second core network and, in the process, registration failed, the processor 921 stops attempting a procedure for registration in the second core network until a predetermined criterion is met.

In contrast, unless the UE supports the different type of second core network than the first core network, the processor 921 regards the cell and/or frequency as forbidden. The processor 921 puts on hold an attempt to register in the different type of second core network until a predetermined criterion is met, or the processor 921 performs registration in the first core network using other frequency or other cell or other radio access technique via the transceiver 923.

FIG. 10 is a block diagram illustrating a configuration of a communication device according to an embodiment of the disclosure.

In particular, FIG. 10 illustrates in greater detail the UE of FIG. 9.

Referring to FIG. 10, the UE may include a processor (or a digital signal processor (DSP)) 1010, an RF module (or RF unit) 1035, a power management module 1005, an antenna 1040, a battery 1055, a display 1015, a keypad 1020, a memory 1030, a subscriber identification module (SIM) card 1025 (which is optional), a speaker 1045, and a microphone 1050. The UE may include a single or multiple antennas.

The processor 1010 implements the functions, processes or steps, and/or methods proposed above in connection with FIGS. 1 to 8. Wireless interface protocol layers may be implemented by the processor 1010.

The memory 1030 is connected with the processor 1010 to store information related to the operation of the processor 1010. The memory 1030 may be positioned inside or outside the processor 1010 and be connected with the processor 1010 via various known means.

For example, the user inputs instruction information, e.g., a phone number, by voice activation using the microphone 1050 or by pressing (or touching) a button of the keypad 1020. The processor 1010 receives the instruction information and handles performing a proper function, e.g., calling at the phone number. Operational data may be extracted from the SIM card 1025 or the memory 1030. Further, the processor 1010 may display the instruction information or operational information on the display 1015 for convenience or user's recognition.

The RF module 1035 is connected with the processor 1010 to transmit and/or receive RF signals. The processor 1010 transfers instruction information to the RF module 1035 to initiate communication, e.g., to transmit a wireless signal constituting voice communication data. The RF module 1035 includes a receiver and a transmitter for receiving and transmitting wireless signals. The antenna 1040 functions to transmit and receive wireless signals. Upon receiving a wireless signal, the RF module 1035 transfers the signal for processing by the processor 1010 and convert the signal into a base-band signal. The processed signal may be converted into readable or audible information output via the speaker 1045.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the present disclosure should be determined by reasonable interpretations of the appended claims and all equivalents of the present disclosure belong to the scope of the present disclosure.

INDUSTRIAL AVAILABILITY

Although the disclosure has been shown and described in connection with examples applied to 3GPP LTE/LTE-A systems, the present disclosure may also be applicable to other various wireless communication systems, in particular fifth generation (5G) systems, than 3GPP LTE/LTE-A systems.

The invention claimed is:

1. A method performed by a user equipment (UE) in a wireless communication system, the method comprising:
    transmitting, to a first core network, a registration request message via a cell connected to the first core network and a second core network;
    receiving, from the first core network, a registration reject message via the cell, wherein the registration reject message comprises a cause value related to a rejection of registration and wherein the cause value is set to inform that a registration to the second core network is required; and
    performing a procedure for registration in the second core network based on identifying the cause value.

2. The method of claim 1, further comprising:
    receiving information indicating that the cell is connected to the first core network and the second core network from the first core network.

3. The method of claim 1, further comprising:
    receiving information indicating the second core network is allowed from the first core network.

4. The method of claim 3, wherein the information indicating the second core network is allowed is received during a radio resource control (RRC) connection release procedure.

5. The method of claim 1, further comprising:
    upon receiving the registration reject message, disabling access to the first core network.

6. The method of claim 1, wherein
    the cause value indicates that the first core network is not allowed and redirection to the second core network is required.

7. The method of claim 1, wherein
    unless the UE supports the second core network, the UE regards the first cell as forbidden.

8. The method of claim 1, wherein
    the UE puts on hold an attempt to perform the procedure for registration in the second core network until a predetermined criterion is met.

9. The method of claim 1, further comprising:
    unless the UE supports the second core network, performing a procedure for registration in the first core network on a different cell other than the cell.

10. The method of claim 1, wherein
    when a base station of the UE is able to connect to both the first core network and the second core network, the base station of the UE is regarded as a first type of radio access network when connected with the first core network and as a second type of radio access network when connected with the second core network.

11. The method of claim 1, further comprising:
    determining whether a signal strength of the cell is a predetermined level or more based on the cause value.

12. The method of claim 11, wherein
    when the signal strength of the cell is the predetermined level or more, a procedure for registration in the second core network supported on the cell is performed.

13. The method of claim 11, further comprising:
    unless the signal strength of the cell is the predetermined level or more, selecting a different cell other than the cell.

14. A user equipment (UE) in a wireless communication system, the UE comprising:
    a transceiver for transmitting or receiving a wireless signal; and
    a processor controlling the transceiver, wherein the processor is configured to:
    transmit, to a first core network, a registration request message via a cell connected to the first core network and a second core network;
    receive, from the first core network, a registration reject message via the cell, wherein the registration reject message comprises a cause value related to a rejection of registration and wherein the cause value is set to inform that a registration to the second core network is required; and
    perform a procedure for registration in the second core network based on identifying the cause value.

* * * * *